(No Model.)
J. LINES.
CAPSTAN SCREW.
No. 539,627. Patented May 21, 1895.
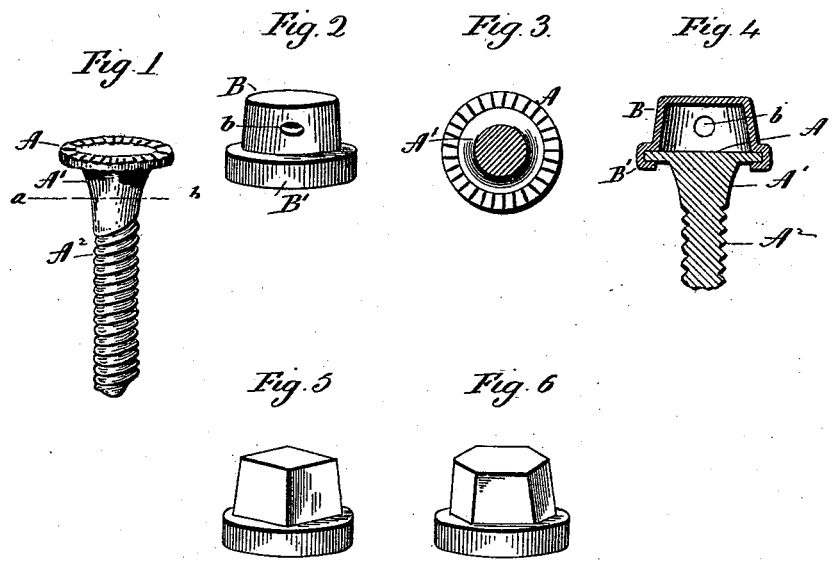

UNITED STATES PATENT OFFICE.

JOHN LINES, OF WATERBURY, CONNECTICUT, ASSIGNOR TO THE SCOVILL MANUFACTURING COMPANY, OF SAME PLACE.

CAPSTAN-SCREW.

SPECIFICATION forming part of Letters Patent No. 539,627, dated May 21, 1895.

Application filed February 18, 1895. Serial No. 538,759. (No model.)

*To all whom it may concern:*

Be it known that I, JOHN LINES, of Waterbury, in the county of New Haven and State of Connecticut, have invented a new Improvement in Capstan-Screws; and I do hereby declare the following, when taken in connection with the accompanying drawings and the letters of reference marked thereon, to be a full, clear, and exact description of the same, and which said drawings constitute part of this specification, and represent, in—

Figure 1, a detached perspective view of the shank or body of a screw constructed in accordance with my invention; Fig. 2, a detached perspective view of the hollow sheet-metal head of the screw; Fig. 3, a view in transverse section of the shank or body on the line $a\,b$ of Fig. 1, and looking toward the flanged head end of the screw; Fig. 4, an enlarged view of the screw in longitudinal central section; Figs. 5 and 6, detached perspective views of modified forms which the hollow sheet-metal head may assume.

My invention relates to an improvement in that class of wood screws known as "capstan-screws" which are used in the manufacture of piano-actions, but which are not limited to employment in that way, the object of my invention being to produce, at a low cost of manufacture, a superior capstan-screw of attractive appearance.

With these ends in view, my invention consists in the combination with a screw-body or shank of a hollow sheet-metal head applied to the head end of the screw-body and clamped thereupon.

My invention further consists in certain details of construction as will be hereinafter described and pointed out in the claims.

In carrying out my invention I form a flange A, upon the enlarged head-end A' of the screw-body or shank $A^2$, which may be of any approved construction, and produced in any convenient and practicable way. The flange A is located in a plane at a right angle to the longitudinal axis of the screw-body $A^2$ and is by preference roughened or fluted upon its upper and lower edges, either or both, by subjecting it to pressure in dies, or in any other way. To the said flange I apply a hollow sheet-metal head B, furnished at its lower end with an outwardly set annular flange B', the edge of which is clasped over the flange A, already mentioned, and pinched down firmly thereupon, whereby the roughening of the flange A prevents the sheet-metal head B from rotating, and binds the two parts solidly together. As shown in Figs. 2 and 4 of the drawings, the head has a very slightly tapering circular body-portion, containing perforations $b$ to receive a pin or other key, by means of which the screw is turned. I do not, however, limit myself to making the hollow sheet-metal heads in the form shown by Figs. 2 and 4, as they might be made, for instance, in the forms shown by Figs. 5 and 6, or in still other ways. The faces of the bodies of the heads shown by Figs. 5 and 6, adapt them to receive wrenches for turning the screws.

It is obvious that screws constructed in accordance with my invention may be produced at a low cost of manufacture with superior precision and nicety, and it is certain they present a most attractive appearance, and admit of a fine finish. I am also enabled to make them in a pleasing variety of styles by varying the form of their heads. It is therefore apparent that in carrying out my invention I may make some changes from the forms herein shown, and I would therefore have it understood that I do not limit myself to the exact construction herein shown, but hold myself at liberty to make such variations therefrom as fairly fall within the spirit and scope of my invention.

Having fully described my invention, what I claim as new, and desire to secure by Letters Patent, is—

1. A capstan screw comprising a body or shank having its head end flanged and roughened, and a hollow sheet-metal head the edge of which is clasped over the roughened portion of the flanged head-end of the body or shank, substantially as described.

2. A capstan-screw comprising a body or shank, having its head-end constructed with a roughened flange, and a hollow sheet-metal head or body constructed at its lower end with a flange, the edge of which is clasped over the flange of the shank or body, the body of the said hollow head being adapted to receive an instrument for turning the screw, substantially as described.

In testimony whereof I have signed this specification in the presence of two subscribing witnesses.

JOHN LINES.

Witnesses:
M. L. SPERRY,
W. E. TWINING.